Sept. 19, 1933.   C. D. WALLOND   1,927,622
AUTOMOBILE EMERGENCY BRAKE RELEASING MECHANISM
Filed Sept. 30, 1932
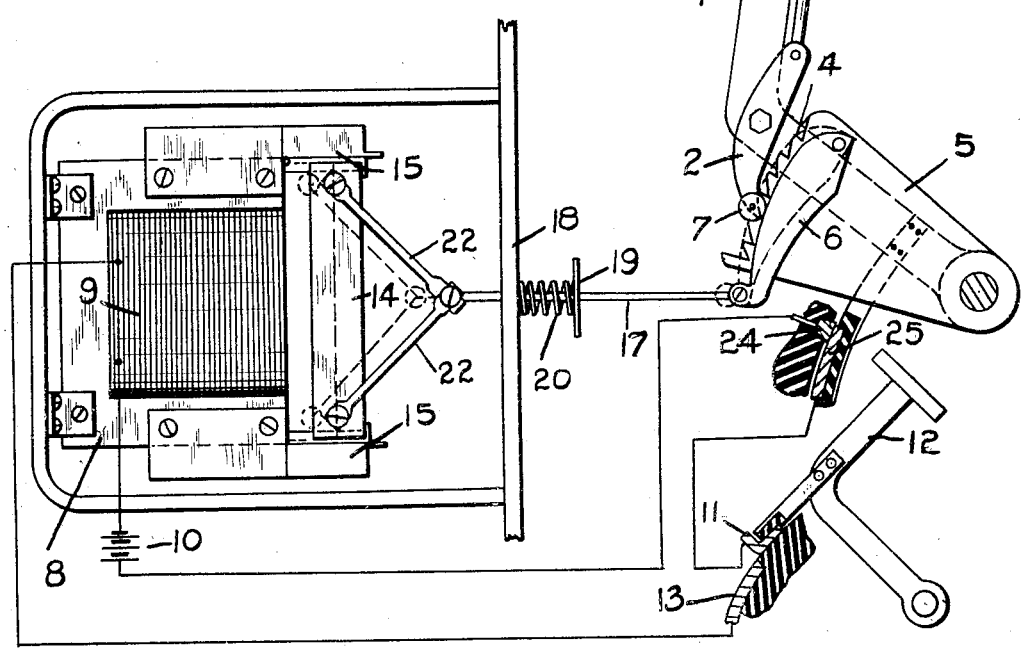
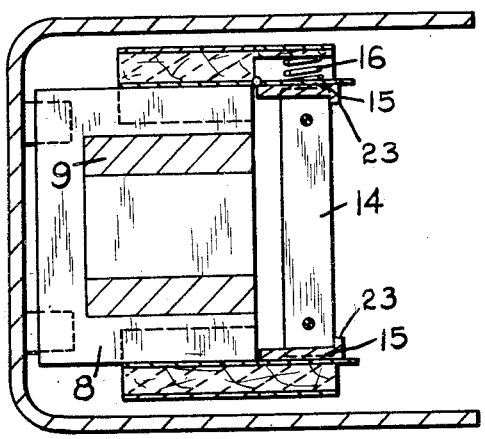
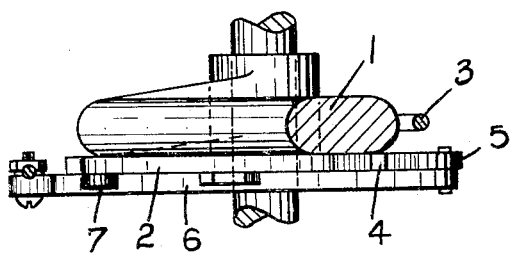
Inventor
C. D. WALLOND
By
Fetherstonhaugh & Tansley
Attorneys Patented Sept. 19, 1933

1,927,622

UNITED STATES PATENT OFFICE 1,927,622

AUTOMOBILE EMERGENCY BRAKE RELEASING MECHANISM

Charles David Wallond, Guelph, Ontario, Canada

Application September 30, 1932
Serial No. 635,682

6 Claims. (Cl. 74—39)

My invention relates to improvements in automobile emergency brake releasing mechanism, and the object of the invention is to devise means for automatically releasing the emergncy brake upon the foot operated clutch pedal being depressed into the released position. A further object is to actuate such a mechanism through the medium of electrical means in circuit with the automobile battery.

With the above and other objects in view which will hereinafter appear, my invention consists in its preferred embodiment of the construction all as hereinafter more particularly described and illustrated in the accompanying drawing in which:—

Fig. 1 represents in side elevation an emergency brake lever and a clutch pedal showing my mechanism attached thereto, the view being partly diagrammatic.

Fig. 2 is a vertical sectional view through an electromagnet which preferably constitutes the means for actuating the mechanism, and Fig. 3 is a plan view of the emergency brake lever showing my mechanism attached thereto.

Like characters of reference indicate corresponding parts in the different views.

The fulcrumed emergency brake lever 1 provided with the usual pivoted pawl 2 operated by a plunger 3 and adapted to coact with the respective teeth 4 of a quadrant 5 is part of the standard equipment of the automobile, truck or tractor. Pivoted at one end to the quadrant 5 is a cam arm 6, the upper surface of which conforms more or less with the arc of the toothed portion of the quadrant.

The tip of the pawl 2 has a laterally protruding roller 7 or other suitable anti-friction means journalled or mounted thereon.

An electromagnet 8 is suitably attached to the vehicle in proximity to the emergency brake lever and comprises the coil 9 connected in circuit with the automobile battery 10, and a switch for closing the electromagnet circuit is also provided, one contact 11 of which is preferably mounted on the clutch pedal arm 12 and the other contact 13 suitably attached in a fixed position is adapted to coact with the contact 11 closing the circuit when the clutch pedal is depressed.

An electromagnet armature bar 14 is slidably mounted in the guides 15, and one of such guides is hingedly mounted and spring held by the spring 16 in its operative position.

A rod 17 extending through an abutment 18 is provided with an enlargement 19 and a coiled spring 20 is interposed between the abutment and the enlargement. One end of the rod 17 is pivotally connected to the free end of the cam arm 6 and the other end is pivotally connected to two diverging links 22 pivotally connected at their free ends to the armature bar 14.

A second switch comprising the fixed contact 24 and the movable contact 25, the latter mounted on the emergency brake lever, is introduced into the electromagnet circuit. This switch is closed when the emergency lever is in the engaged position and open when the latter is released.

Assuming that the emergency brake lever 1 is in the engaged position as illustrated in Fig. 1 with the emergency brake on and the contacts 24 and 25 in contact, when the driver of the car depresses the clutch pedal 12 the contact 11 is brought into contact with the contact 13 and the electromagnet circuit is closed energizing the coil 9 and consequently attracting the armature bar 14 towards it. Through the medium of the links 22 the rod 17 is drawn forward with the result that the cam arm 6 is swung upwardly engaging the roller 7 and lifting the pawl 2 from engagement with the teeth 4 of the quadrant 5. Thus the emergency brake is automatically released.

Upon opening the electromagnet circuit the spring 20 pushes the rod rearwardly restoring the cam 6 to its initial position and also drawing back the armature bar 14.

The contacts 24 and 25 are out of contact unless the emergency brake lever is in the engaged position and thus the electromagnet circuit cannot be closed by the actuation of the clutch pedal, in operating the vehicle when the emergency brake lever has not been applied.

The provision of the hinged guide 15 enables the armature bar to be removed and such guides have stops 23 at their rear ends to limit the backward movement of the armature bar 14 when in its operative position.

From the above description it will be apparent that I have devised a simple and effective mechanism for automatically releasing the emergency brake when the clutch pedal of the vehicle is operated thus preventing the prevalent misuse of the emergency brake when the car is being driven off from its stopped position.

What I claim as my invention is:

1. In an automobile, in combination, an emergency brake lever, a pivoted pawl thereon, a toothed quadrant with which the pawl is adapted to engage, a clutch pedal, an electromagnet including a coil and an armature, an electromagnet circuit, a switch adapted to be closed by the depressing of the clutch pedal in such electromagnet circuit, means actuated by the armature upon it being attracted by the energized coil for disengaging the emergency lever pawl from its quadrant, a second switch in the electromagnet circuit operatively connected to the emergency brake lever and alternatively closed and opened thereby upon the emergency brake lever being moved into the engaged and released position, said second switch functioning independently of the first mentioned switch.

2. In an automobile, in combination, an emergency brake lever, a pivoted pawl thereon, a toothed quadrant with which the pawl is adapted to engage, a clutch pedal, an electromagnet including a coil and an armature, an electromagnet circuit, a switch adapted to be closed by the depressing of the clutch pedal in such electromagnet circuit, a swingable arm pivoted to the quadrant adapted to engage the pawl, an operative connection between the swingable arm and the armature for swinging up the arm to disengage the pawl from the quadrant upon the armature being attracted by the energized coil, a second switch in the electromagnet circuit operatively connected to the emergency brake lever and alternatively closed and opened thereby upon the emergency brake lever being moved into the engaged and released positions, said second switch functioning independently of the first mentioned switch.

3. In an automobile, in combination, an emergency brake lever, a pivoted pawl thereon, a toothed quadrant with which the pawl is adapted to engage, a clutch pedal, an electromagnet including a coil and an armature, an electromagnet circuit, a switch adapted to be closed by the depressing of the clutch pedal in such electromagnet circuit, a swingable arm pivoted to the quadrant adapted to engage the pawl, an operative connection between the swingable arm and the armature for swinging up the arm to disengage the pawl from the quadrant upon the armature being attracted by the energized coil, means for simultaneously drawing back the armature from engagement with the coil and restoring the swingable arm to its initial position upon the electromagnet circuit being opened, a second switch in the electromagnet circuit operatively connected to the emergency brake lever and alternatively closed and opened thereby upon the emergency brake lever being moved into the engaged and released positions, said second switch functioning independently of the first mentioned switch.

4. In an automobile emergency brake releasing mechanism, the combination with an automobile clutch pedal and an emergency brake lever including means for releasably setting it in the operative or engaged position, of electromagnetic means operatively connected to the emergency brake lever setting means including an electromagnet circuit and a switch therein adapted to be closed upon the clutch pedal being depressed, and means operatively connected to the emergency brake lever for preventing the closing of the electromagnetic circuit upon the release of such emergency brake lever despite the closing of the switch actuated by the clutch pedal.

5. In an automobile emergency brake releasing mechanism, the combination with an automobile clutch pedal and an emergency brake lever including means for releasably setting it in the operative or engaged position, of electromagnetic means operatively connected to the emergency brake lever setting means including an electromagnet circuit and a switch therein adapted to be closed upon the clutch pedal being depressed, and a second switch in the electromagnet circuit operatively connected to the emergency brake lever and closed only when the emergency brake lever is in its set or engaged position.

6. In an automobile emergency brake releasing mechanism, the combination with an emergency brake lever and its releasable setting means, of an electromagnet including a coil and a slidable bar armature, a rod operatively connected at one end to the emergency lever setting means, a pair of diverging links pivoted at one end of each of the other end of the rod, the free ends of the links being pivoted to the bar armature, a spring for normally retracting the bar armature from the coil, and means for energizing the electromagnet and attracting the armature releasing the connected emergency lever setting means.

CHARLES DAVID WALLOND.